United States Patent [19]

Shiotani

[11] Patent Number: 5,206,035
[45] Date of Patent: Apr. 27, 1993

[54] AUTOMATIC MOLD CLAMPING APPARATUS FOR MOLDING MACHINE

[75] Inventor: Yosuke Shiotani, Nagoya, Japan

[73] Assignee: Star Seiki Co., Ltd., Aichi, Japan

[21] Appl. No.: 863,426

[22] Filed: Apr. 3, 1992

[30] Foreign Application Priority Data

Aug. 8, 1991 [JP] Japan .................................. 3-224799

[51] Int. Cl.$^5$ ............................................. B29C 45/66
[52] U.S. Cl. .................................... 425/186; 425/589
[58] Field of Search ................................ 425/186, 589

[56] References Cited

U.S. PATENT DOCUMENTS 4,976,602 12/1990 Yamazaki .............................. 425/589

FOREIGN PATENT DOCUMENTS 64-10330 1/1989 Japan .
2-73314 6/1990 Japan .
2-73316 6/1990 Japan .
2-73317 6/1990 Japan .

Primary Examiner—Bernard Nozick
Attorney, Agent, or Firm—Frishauf, Holtz, Goodman & Woodward

[57] ABSTRACT

Herein disclosed is an automatic mold clamping apparatus for a molding machine. The mold clamping apparatus comprises: support bolts anchored at a peripheral edge of mold clamping positions of the stationary and movable mounts of the molding machine and having axes aligned with the axes of tie bars; clamping members each supported movably relative to the corresponding one of the support bolts between an engaged position, in which the each clamping member is engaged with a portion of a mold, and a disengaged position in which the same is disengaged from the mold; a moving member for moving the each clamping member between the engaged position and the disengaged position; nut members each meshing with the each clamping member for moving the each clamping member to the mold; a wrench member having a socket portion meshing with the each nut member for turning the socket member forward or backward; and a wrench drive member actuated by a cylinder connected to the wrench member for turning the wrench member reciprocally on the socket portion.

4 Claims, 10 Drawing Sheets

AUTOMATIC MOLD CLAMPING APPARATUS FOR MOLDING MACHINE

BACKGROUND OF THE INVENTION

1. Field of the Invention

The present invention relates to an automatic mold clamping apparatus for fixing a mold on the stationary and movable side mounts of a molding machine.

2. Description of the Prior Art

A molding machine is equipped with an automatic mold clamping apparatus for clamping a pair of supplied molds on corresponding mounts.

This automatic mold clamping apparatus is constructed to include: clamp pawls for engaging with the upper and lower portions of a mold, which is placed on support rollers of each mount, and cylinders having their rods carrying the clamp pawls thereon. The mold is clamped by actuating the cylinders to engage the clamp pawls with the mold.

However, the automatic mold clamping apparatus of the prior art described above requires an oil pressure circuit therefor in addition to the mold mating cylinder of a molding machine and the moving cylinder of an injection unit.

This makes it necessary for the molding machine to be equipped with a separate oil pressure circuit. Thus, there arises a problem that the molding machine is troubled by its reconstruction to have its production cost raised.

Moreover, the automatic mold clamping apparatus of this kind has to be equipped with a safety mechanism for preventing the clamp pawls from being disengaged in case of failure, so as to ensure safety of the worker in case of a mal-function of the oil pressure circuit. This further complicates the construction of the automatic mold clamping apparatus itself to raise the production cost additionally.

SUMMARY OF THE INVENTION

The present invention has been conceived to solve the above-specified defects of the prior art and has an object to provide an automatic mold clamping apparatus for a molding machine, which is enabled even by a simple construction to clamp individual molds reliably on the stationary and movable mounts and to prevent the clamped molds reliably from being unclamped by themselves thereby to ensure the safety of the worker.

According to the present invention, there is provided an automatic mold clamping apparatus for a molding machine, which comprises: support bolts anchored at a peripheral edge of mold clamping positions of the stationary and movable mounts of the molding machine and having axes aligned with the axes of tie bars; clamping members each supported movably relative to the corresponding one of the support bolts between an engaged position, in which the each clamping member is engaged with a portion of a mold, and a disengaged position in which the same is disengaged from the mold; a moving member for moving the each clamping member between the engaged position and the disengaged position; nut members each meshing with the each clamping member for moving the each clamping member to the mold; a wrench member having a socket portion meshing with the each nut member for turning the socket member forward or backward; and a wrench drive member actuated by a cylinder connected to the wrench member for turning the wrench member reciprocally on the socket portion.

BRIEF DESCRIPTION OF THE DRAWINGS

Other objects and features of the present invention will become apparent from the following description to be made with reference to the accompanying drawings, in which:

FIG. 6 is a section showing the state, in which a mold is taken in;

DESCRIPTION OF THE PREFERRED EMBODIMENTS

One embodiment embodying the present invention in a molding machine adopting an automatic mold exchanging system will be described in the following with reference to the accompanying drawings.

Figure 1:
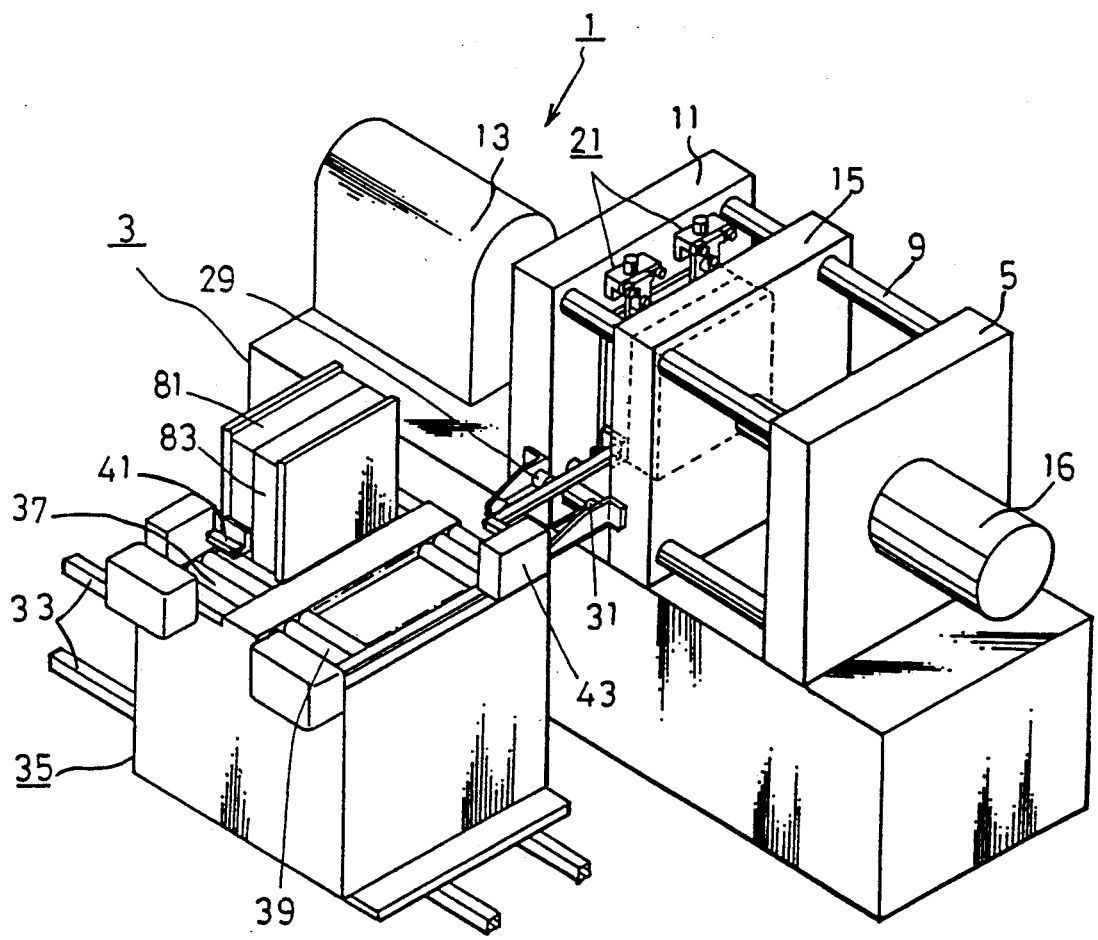
FIG. 1 is a perspective view showing an automatic mold exchanging system schematically.
Figure 2:
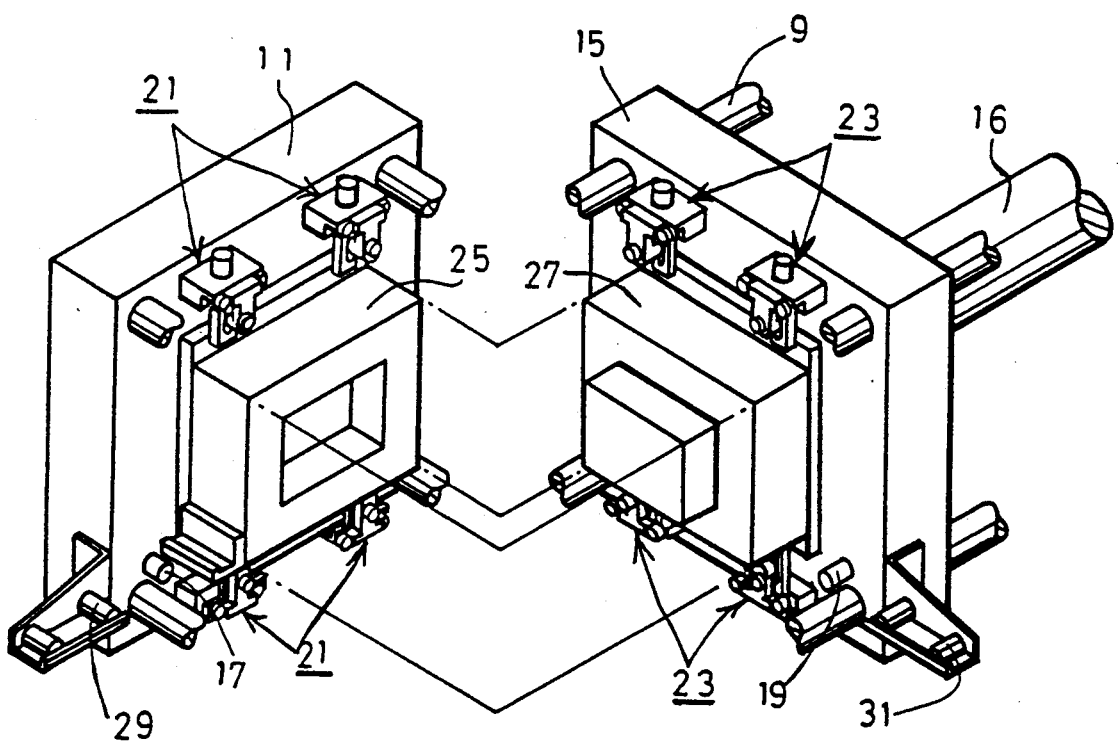
FIG. 2 is a perspective view showing the state, in which molds are attached to stationary and movable mounts.

The automatic mold exchanging system will be described at first with reference to FIGS. 1 and 2.

A molding machine 1 has its body frame 3 equipped with a stationary mount 11 and a support plane 5, which are opposed at a predetermined spacing to each other. Four tie bars 9 are interposed in diagonal positions between the stationary mount 11 and the support plate 5.

On the body frame 3 at the side of the stationary mount 11, there is arranged an injection unit 13 which has its injection screw moved into a (notshown) through whole formed in the center of the stationary mount 11.

On the tie bars 9, moreover, there is axially movably supported a movable mount 15, to which is connected a mold clamping cylinder 16 attached to the body frame 3.

To the lower portions of the stationary mount 11 and the movable mount 15, there are attached at a predetermined spacing a number of support rollers 17 and 19 which are positioned on a line slightly above the lower tie bars 9.

To the stationary mount 11 and the movable mount 15, there are further attached laterdescribed automatic mold clamping apparatuses 21 and 23 which are positioned at the upper and lower portions around the molds to be mounted.

To the front faces of the stationary mount 11 and the movable mount 15, there are attached connecting rollers 29 and 31 which are in a plane with the conveyance face of the support rollers 17 and 19.

To the floor at the front side of the molding machine 1, there are attached a pair of rails 33 which are extended in the axial direction of the tie bars 9.

A truck 35 is enabled to run on the paired rail by it self. On the truck 35, there are carried a take-in conveyer 37 and a take-out conveyer 39, which are aligned with the connecting rollers 29 and 31. On the truck 35 at the side of the take-in conveyer 37 and the take-out conveyer 39, there are supported a pusher 41 and a puller 43 which can move along the take-in and take-out conveyers 37 and 39.

Figure 3:
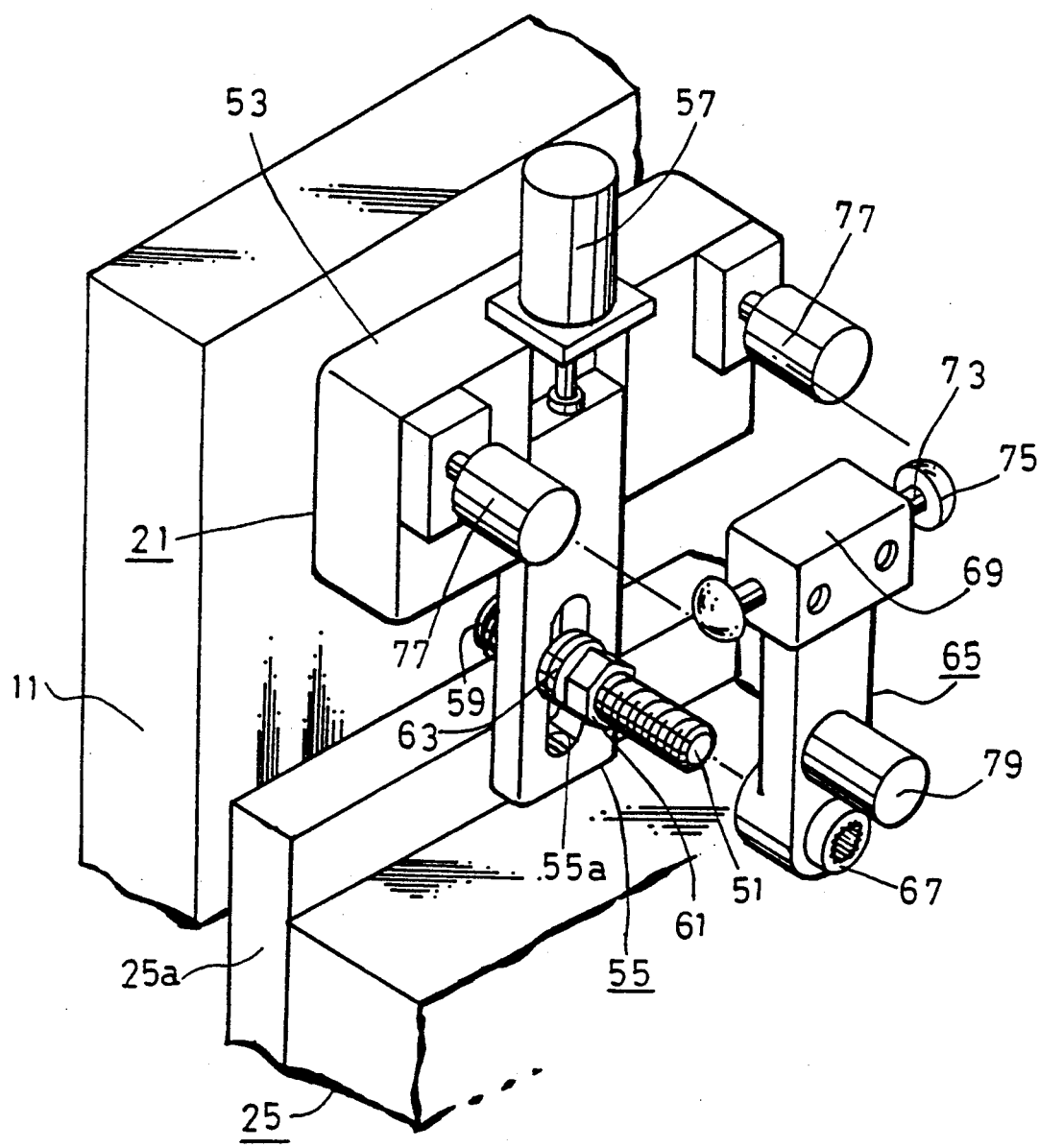
FIG. 3 is an exploded perspective view showing an automatic mold clamping apparatus schematically.
Figure 4:
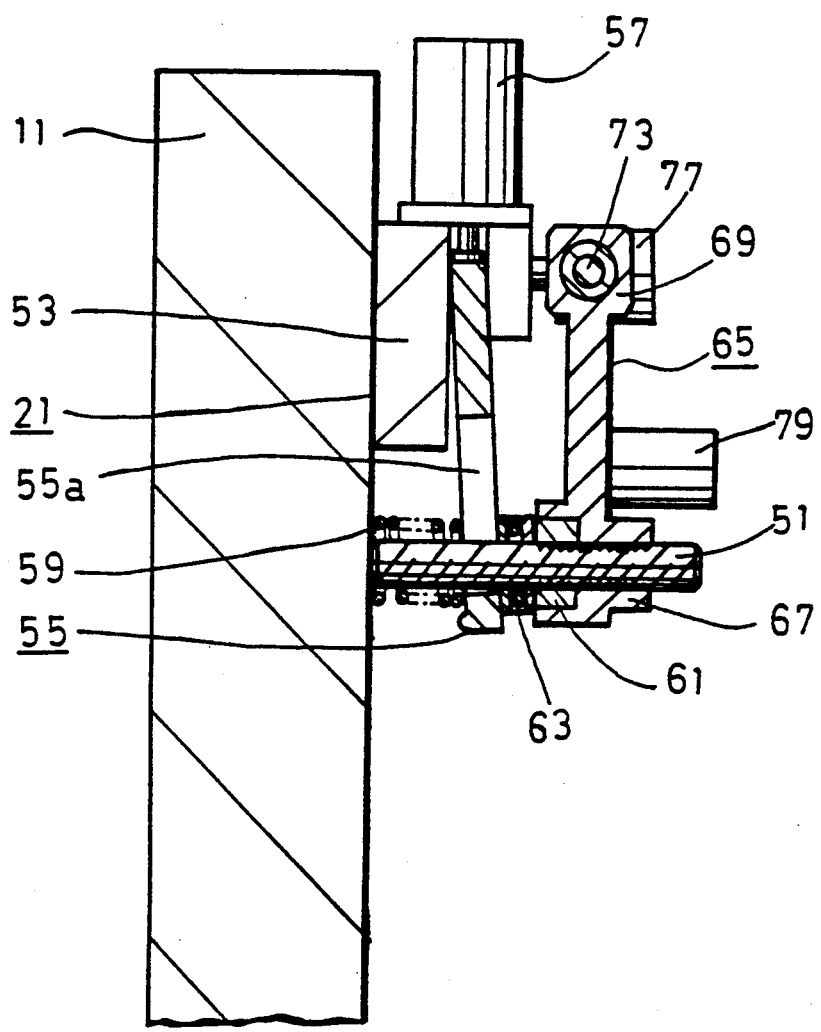
FIG. 4 is a sectional view showing an automatic mold clamping apparatus.
Figure 5:
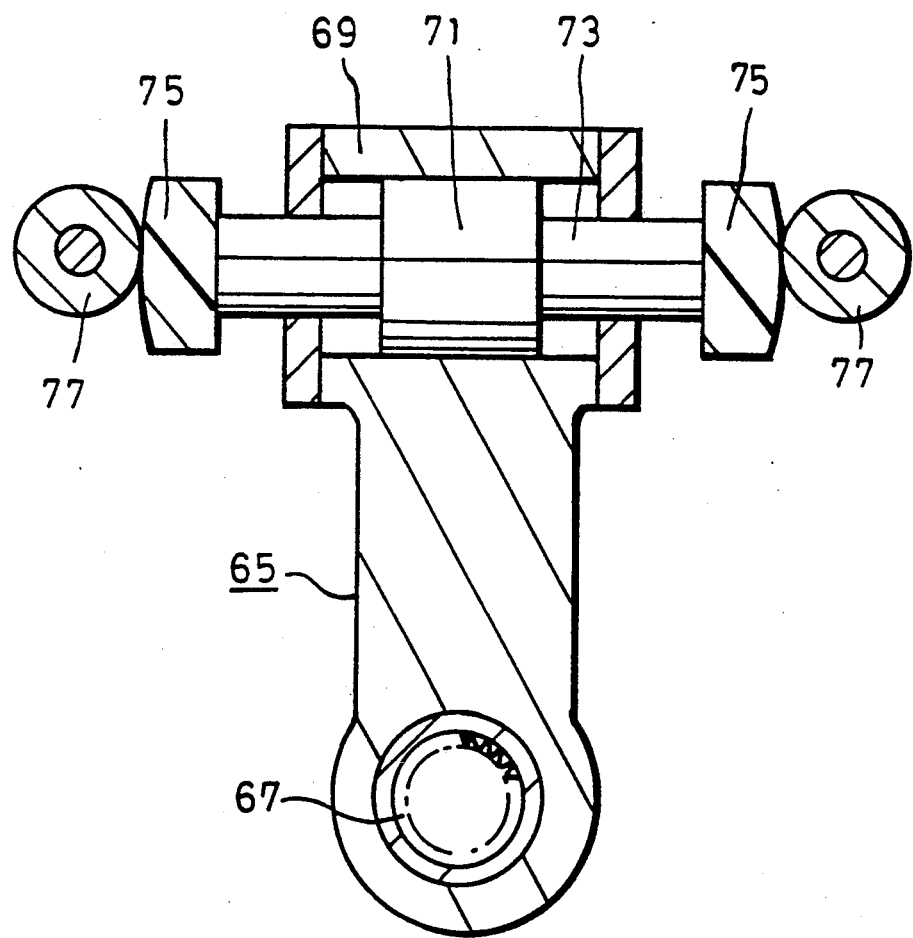
FIG. 5 is a sectional view showing an automatic mold clamping apparatus.

Next, the automatic mold clamping apparatus will be described with reference to FIGS. 3 to 5.

The automatic mold clamping apparatus 21 mounted on the stationary mount 11 (although the automatic mold clamping apparatus 23 mounted on the movable mount 15 will not be described because it has the same construction as that of the automatic mold clamping apparatus 21 of the stationary mount 21) has its support bolts 51 so anchored to the stationary mount 11 as to correspond to the two sides of upper and lower portions of the bed 25a of a mold 25.

To the stationary mount 11 at the outside of each support bolt 51, moreover, there is attached a support base 53 movably supporting the leg of a clamping plate 55, which in turn is supported by the support bolt 51.

More specifically, the clamping plate 55 is formed in its leading end portion with a longitudinally extended slot 55a, in which the support bolt 51 is movably inserted.

In the support base 53, there is fitted a sliding cylinder 57 acting as a moving member, to which the aforementioned clamping plate 55 is connected. By the action of the sliding cylinder 57, moreover, the clamping plate 55 is moved between an engaged position, in which its leading end portion can engage with the mold bed 25a, and a disengaged position in which the same is disengaged from the mold bed 25a. Between the stationary mount 11 and the clamping plate 55 and on the support bolt 51, there is fitted a compression spring 59 for urging the clamping plate 55 toward an unclamping side by its elastic force. On the other hand, a nut member 61 meshes through a bearing 63 with each of the support bolts 51 which are anchored at the clamping plate 55. On the nut member 61, moreover, there is fitted a socket portion 67 of a wrench member 65 such that the support bolt 51 is inserted therethrough. The socket portion 67 is turned forward or backward by switching the engagement of a (notshown) pawl portion with a (notshown) ratchet which is formed on its outer circumference.

Each wrench member 65 is formed at its other end portion integrally with a cylinder tube 69, in which is hermetically received a rod 73 carried by a piston 71. To the two end portions of the rod 73, there are individually attached support blocks 75 which are curved to match the turning radius of the wrench member 65. Each support block 75 is supported by a support roller 77 which has an external diameter matching the curvature of the support block 75 and which is carried by the support base 53.

To each wrench member 65, there is attached a reversing member 79. This reversing member 79 is constructed by connecting the shaft of a rotary actuator to the pawl portion of the socket portion 67.

Figure 6:
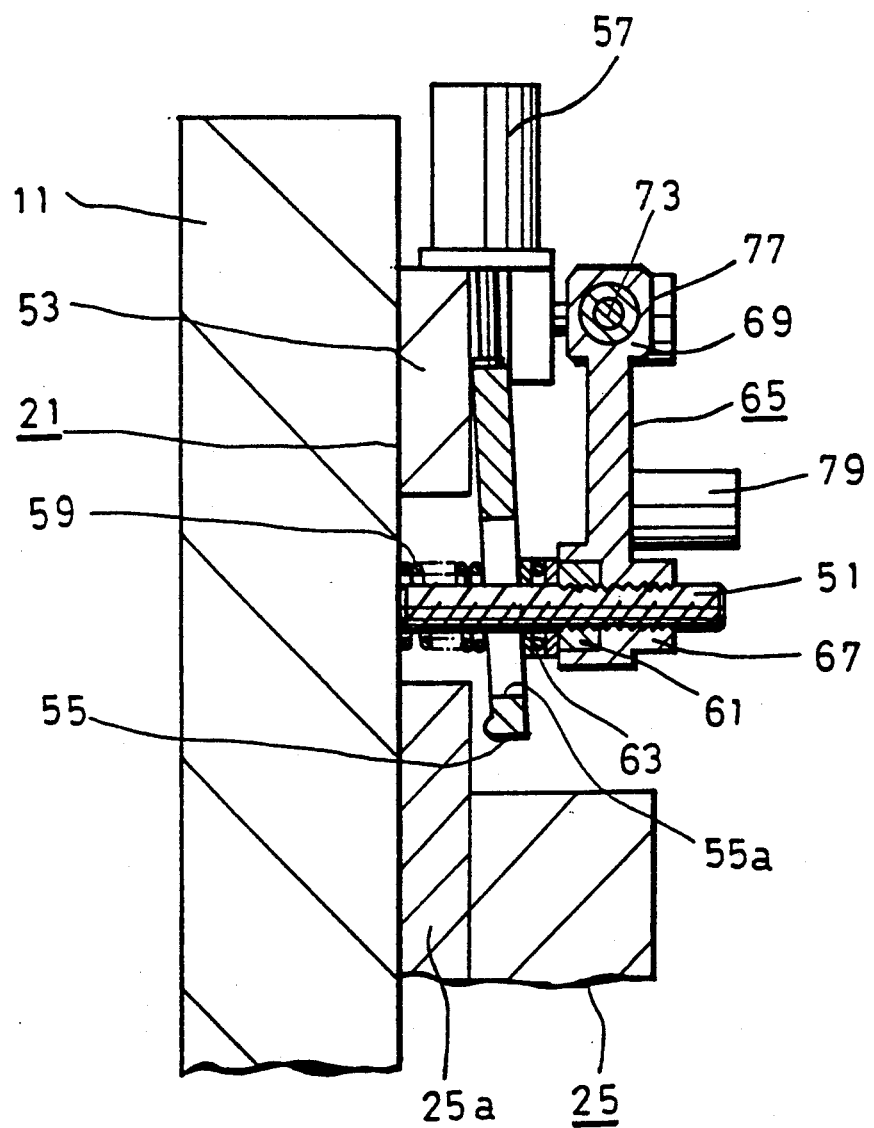
Figure 7:
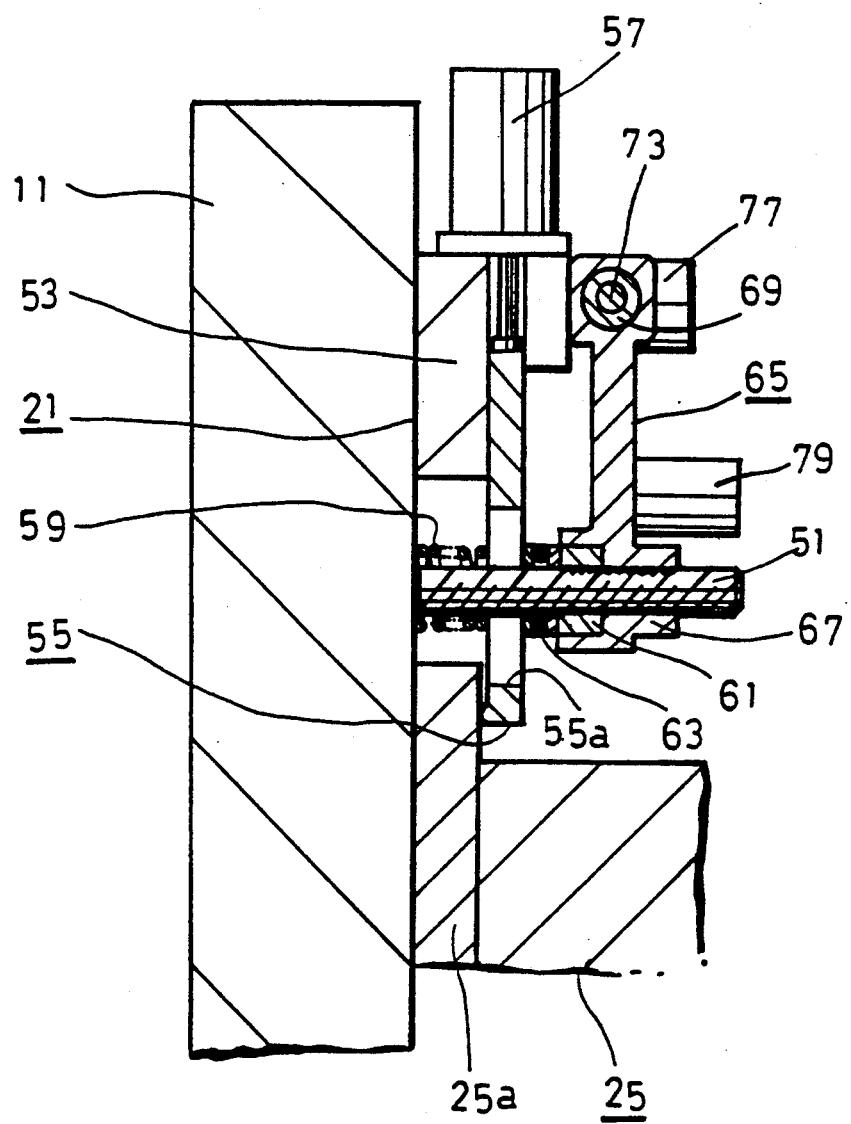
FIG. 7 is a section showing the state, in which a clamping plate is moved to an engagement position.
Figure 8:
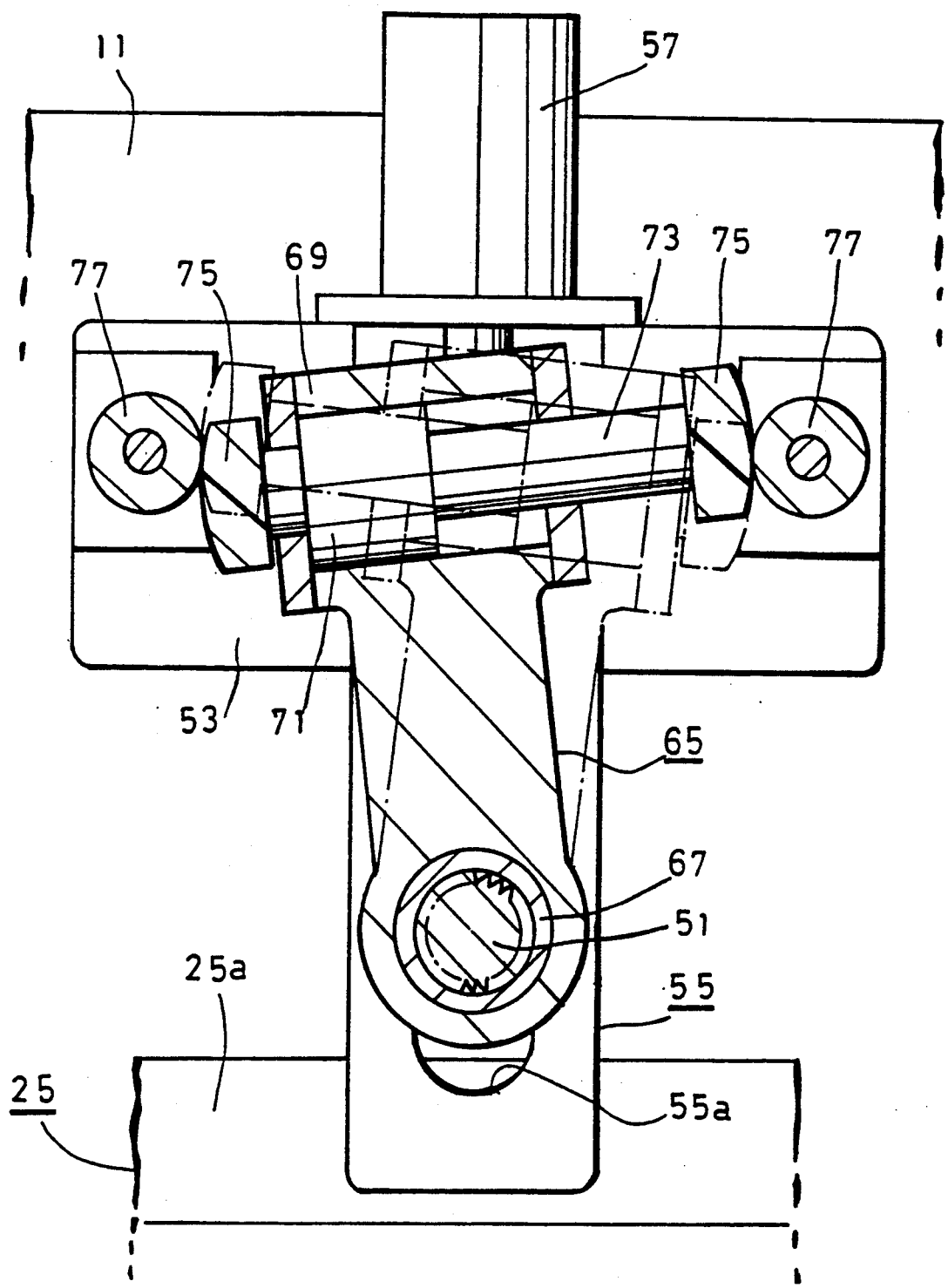
FIG. 8 is a section showing the state the mold is clamped.

Next, the mold clamping operation of the automatic mold clamping apparatus thus constructed will be described with reference to FIGS. 6 to 8.

The truck 35 is operated to run by itself till the takeout conveyer 39 is aligned with the connecting rollers 29 and 31. Next, the cylinder tube 69 is reciprocated relative to the rod 73 if air is alternately fed to the individual chambers of the cylinder tube 69. Since, at this time, the support blocks 75 carried at the individual axial ends of the rod 73 are supported by the support rollers 77, the wrench member 65 integrated with the cylinder tube 69 is reciprocally turned on the socket portion 67.

Here, the socket portion 67 is switched such that the ratchet and the pawl portion are turned to loosen the nut member 61 by the action of the reversing member 79. As a result, the reciprocally turning wrench member 65 turns the nut member 61 meshing with the support bolt 51 in a loosening direction to release the clamped state of the stationary mount 11 and the mold bed 25a by the clamping plate 55. After this, the clamping plate 55 has its leading end portion moved to a disengaged position with the mold 25 (or 27) if the slide cylinder 57 is returned.

At this time, the molds 25 and 27 are supported in a mating state on the support rollers 17 and 19 of the stationary mount 11 and the movable mount 15. In this state, the puller 43 is moved toward the mold 25 (or 27) until its leading end hook portion 43a engages with a portion of the mold 25 (or 27). After this, the puller 43 is returned to transfer the mold 25 (or 27) from the support rollers 17 (or 19) onto the take-out conveyer 39. Thus, the take-out of the mold 25 (or 27) is completed.

Next, the truck 35 is operated to run by it self, while the mold 25 (or 27) being carried on the take-out conveyer 39, till the take-in conveyer 37 is aligned with the connecting rollers 29 and 31. In this state, the pusher 41 is brought into abutment against portions of paired molds 81 and 83, which are carried on the take-in conveyer 37 and which are to be mounted, to move them toward the molding sections. Then, the molds 81 and 83 are transferred from the take-in conveyor 37 onto the support rollers 17 and 19. At this time, the (notshown) knock pins anchored at the individual mounts 11 and 15 are individually engaged with the engagement holes formed in one or both of the molds 81 and 83, thereby to position the mounts 11 and 15 and the molds 81 an 83 relative to each other.

Moreover, when the molds 81 and 83 are to be transferred onto the support rollers 17 and 19, the engaged state of the pawl portion with the ratchet is so changed by the reversing member 79 that the socket portion 67 is switched to turn only in the clamping direction. Next, the slide cylinder 57 is actuated to move the clamp plate 55 to the engaged position, in which its leading end portion can be engaged with the beds 81a and 83a of the molds 81 and 83. Next, in this state, the air is alternately fed to the individual chambers of the cylinder tube 69 to reciprocate the cylinder tube 69 relative to the rod 73.

Since, at this time, the support blocks 75 at the two end portions of the rod 73 are supported movably relative to the support rollers 77, as has been described hereinbefore, the rod 73 is reciprocated in accordance with the reciprocal movements of the cylinder tube 69 relative to the rod 73 thereby to turn the wrench member 65 reciprocally on the socket portion 67. As a result, the nut member 61 meshing with the socket member 67 is turned in the fastening direction toward the stationary and movable mounts 11 and 15 thereby to thrust the leading end portion of the clamping plate 55 to the mold bed 81a (or 83a). Since, at this time, the nut member 61 meshes with the support bolt 51 through the bearing 63, the nut member 61 can be fastened with a low torque because its contact resistance with the clamping plate can be reduced.

When the fastening force of the mold bed 81a (or 83a) by the clamping plate 55 and accordingly the feed resistance of the air to the cylinder tube 69 exceeds a predetermined pressure, the feed of the air to the cylinder tube 69 is interrupted to complete the clamping operation.

In the description thus far made, the wrench member 65 is turned reciprocally on the socket portion 67 by causing the support blocks 75 attached to the two end portions of the rod 73 to abut against the support rollers 77 thereby to reciprocate the rod 73. However, this construction may be modified, as shown in FIGS. 9 and 10.

Figure 9:
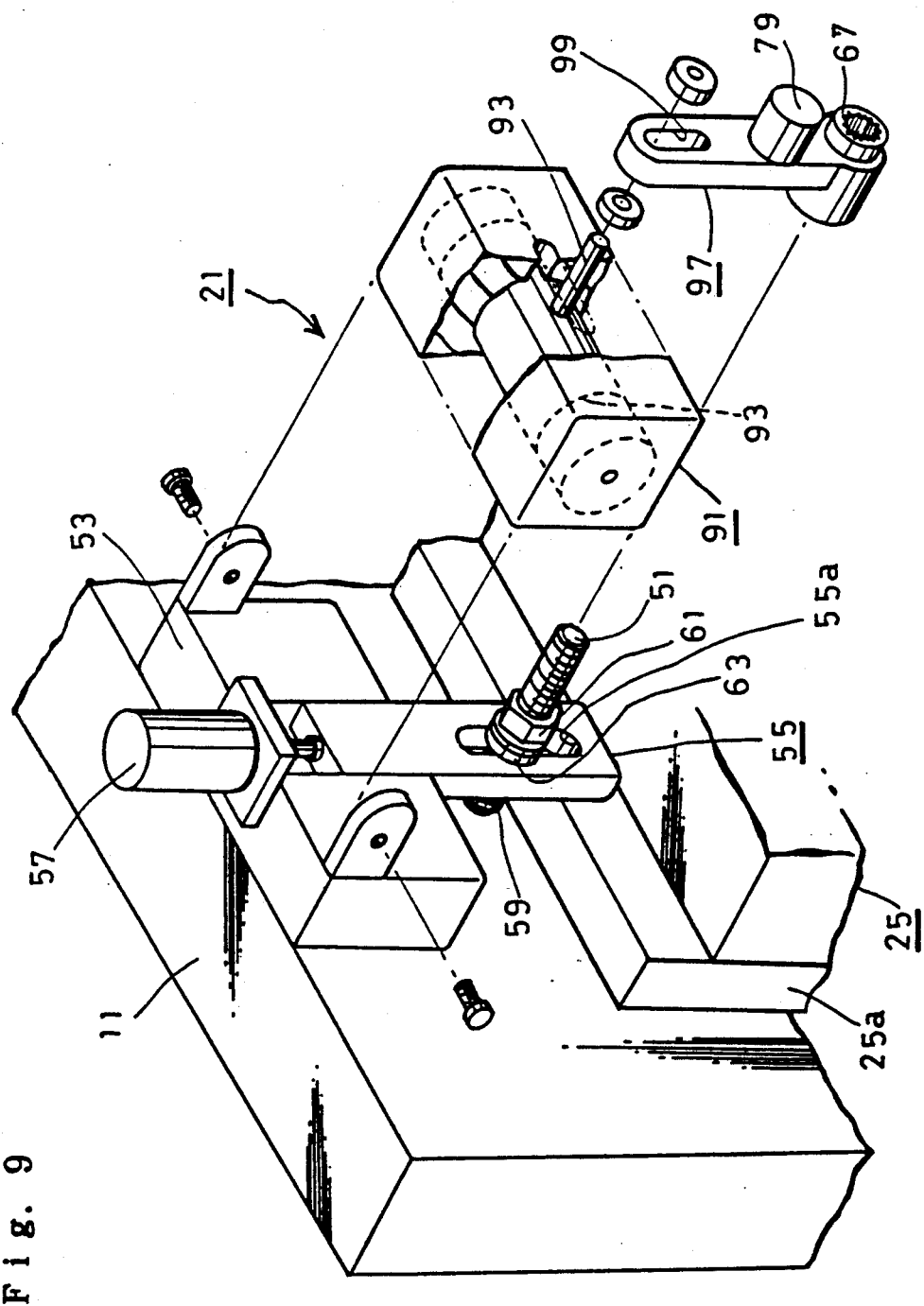
FIG. 9 is an exploded perspective view showing a modified embodiment of the present invention.

As shown in FIG. 9, more specifically, to the middle portion of a piston 93 sliding reciprocally in a cylinder tube 91, there is attached a pin 95 which is projected to the side of the cylinder tube 91 while having its axis directed perpendicularly of the moving direction of the piston 93. The pin 95 is engaged with a slot 99 which is formed in one end of a wrench member 97.

Moreover, this wrench member 97 may be reciprocally turned by the piston 93 which is made reciprocally movable in the cylinder tube 91.

Figure 10:
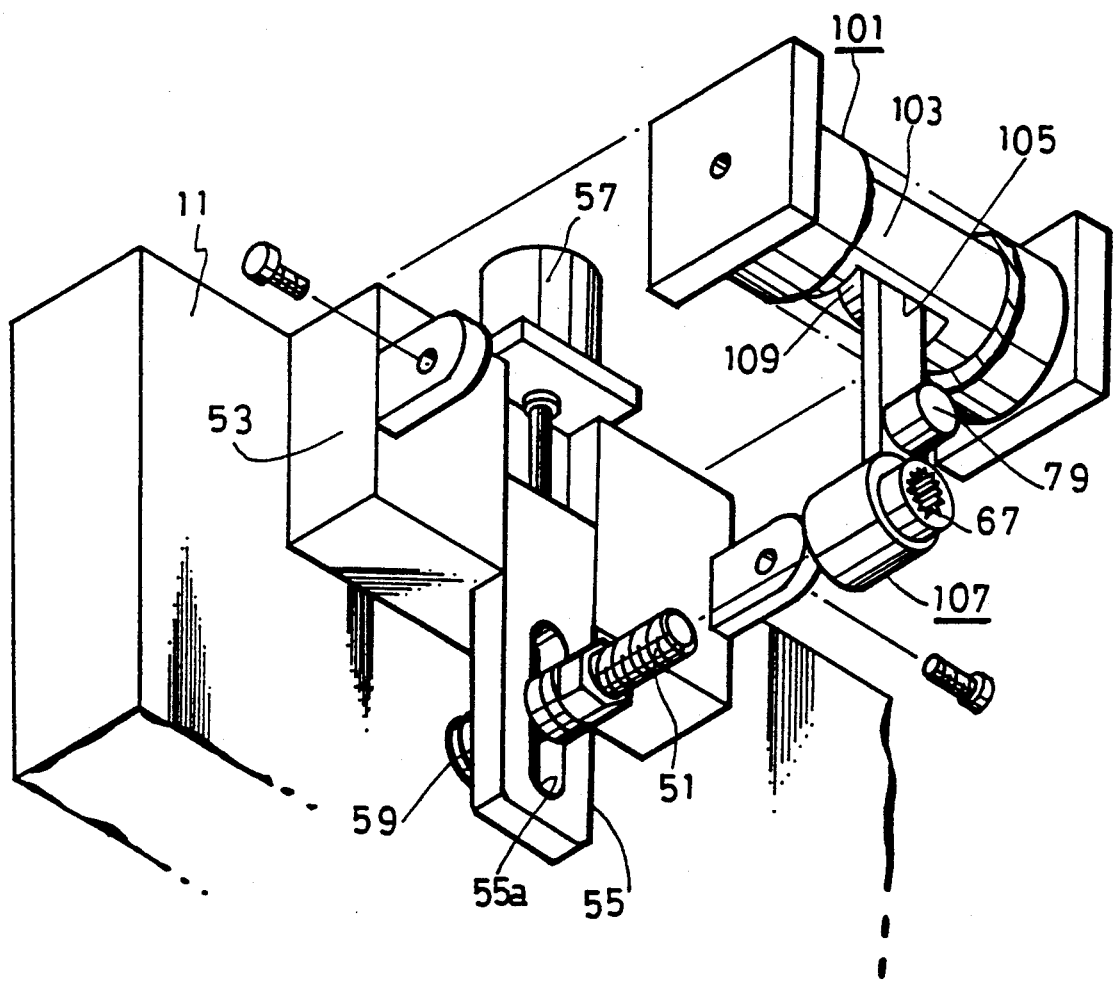
FIG. 10 is also an exploded perspective view showing another modified embodiment of the present invention.

As shown in FIG. 10, on the other hand, a piston 103 sliding reciprocally in a cylinder tube 101 may be formed in its middle portion with a sliding groove 105. A wrench member 107 has its one end engaged with that sliding groove 105 so that it may be reciprocally turned by moving the piston 103 reciprocally.

According to these constructions, unlike the foregoing embodiment, the socket portion can be reciprocally turned to reduce the vibrations without reciprocating the cylinder tube itself.

The description of the present invention thus far made is directed to the molding machine adopting the automatic mold exchanging system. Despite of this description, however, the present invention can also be executed even in case the molds are manually mounted on the mounts of the molding machine without adopting the automatic mold exchanging system.

What is claimed is:

1. An automatic mold clamping apparatus for a molding machine, comprising: support bolts anchored at a peripheral edge of mold clamping positions of the stationary and movable mounts of the molding machine and having axes aligned with the axes of tie bars; clamping members each supported movably relative to the corresponding one of said support bolts between an engaged position, in which said each clamping member is engaged with a portion of a mold, and a disengaged position in which the same is disengaged from said mold; a moving member for moving said each clamping member between said engaged position and said disengaged position; nut members each meshing with said each clamping member for moving said each clamping member to the mold; a wrench member having a socket portion meshing with said each nut member for turning said socket member forward or backward; and a wrench drive member actuated by a cylinder connected to said wrench member for turning said wrench member reciprocally on said socket portion.

2. An automatic mold clamping apparatus for a molding machine, according to claim 1, wherein said wrench drive member includes: a cylinder tube fixed to said wrench member; a rod supported in said cylinder tube movably in the axial direction and having at its middle portion a piston made slidable in said cylinder tube; and support members supporting the two end portions of said rod in a rocking manner, wherein said wrench member is turned reciprocally on said socket portion by moving said cylinder tube reciprocally relative to said rod.

3. An automatic mold clamping apparatus for a molding machine, according to claim 2, wherein said wrench drive member includes: a pin fixed to the piston made slidable in said cylinder tube and protruding to the outside of said cylinder tube; and a slot formed in a lever member of said wrench member and engaged with said pin so that said wrench member is turned reciprocally on said socket portion in accordance with the reciprocal movements of said piston.

4. An automatic mold clamping apparatus for a molding machine, according to claim 2, wherein said wrench drive member includes a sliding groove formed in the middle portion of the piston made reciprocally movable in said cylinder tube and supporting a portion of said wrench member slidably so that said wrench member is turned reciprocally on said socket portion in accordance with the reciprocal movements of said piston.

* * * * *